No. 846,272. PATENTED MAR. 5, 1907.
R. S. WHIPPLE & J. A. OLESSAK.
COMBINED TURNING TOOL AND CALIPERS.
APPLICATION FILED NOV. 15, 1905.
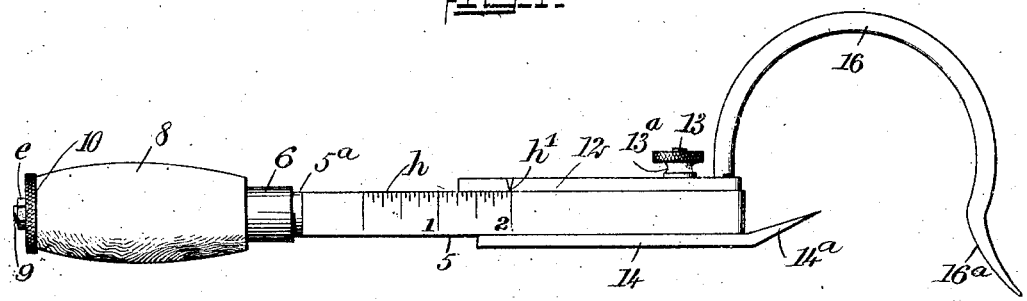
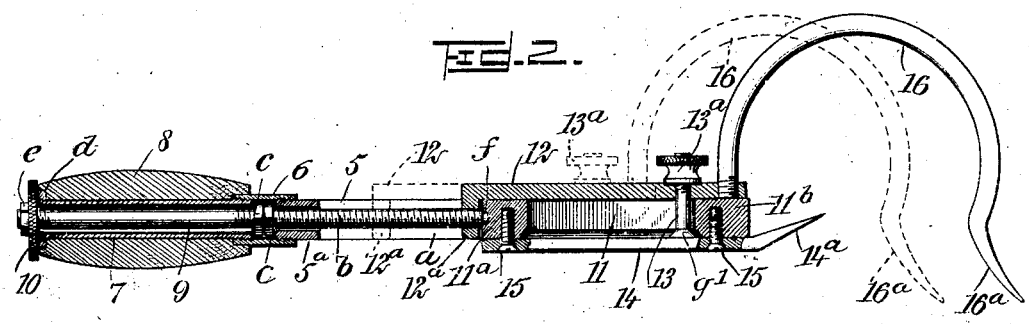
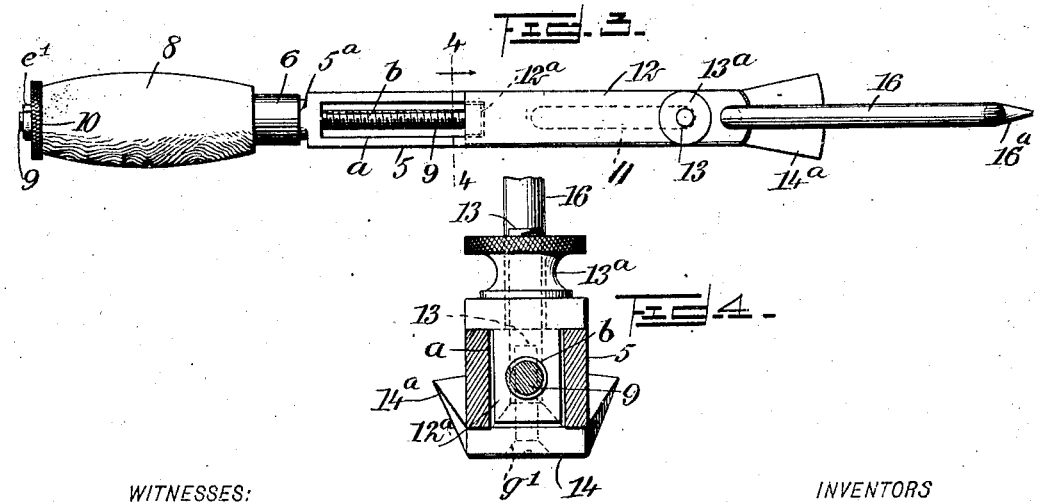
WITNESSES:
INVENTORS
Ray S. Whipple
John A. Olessak
BY
ATTORNEYS

UNITED STATES PATENT OFFICE.

RAY S. WHIPPLE AND JOHN A. OLESSAK, OF PHILADELPHIA, PENNSYLVANIA.

COMBINED TURNING-TOOL AND CALIPERS.

No. 846,272.

Specification of Letters Patent.

Patented March 5, 1907.

Application filed November 15, 1905. Serial No. 287,450.

*To all whom it may concern:*

Be it known that we, RAY S. WHIPPLE, a citizen of the United States, and JOHN A. OLESSAK, a subject of the Emperor of Austria, and both residents of Philadelphia, in the county of Philadelphia and State of Pennsylvania, have invented a new and Improved Combined Turning-Tool and Calipers, of which the following is a full, clear, and exact description.

This invention relates to an improved means for turning wood to exact diameters, and has for its object to provide novel details of construction for a wood-turning tool and for a caliper attachment thereon that are adapted for coöperative use, affording a gage as well as a turning-tool, whereby a piece of material may be rapidly turned to a desired diameter at one operation.

The invention consists in the novel construction and combination of parts, as is hereinafter described, and defined in the subjoined claims.

Reference is to be had to the accompanying drawings, forming a part of this specification, in which similar characters of reference indicate corresponding parts in all the figures.

Figure 1 is a side view of the improved combined turning-tool and caliper. Fig. 2 is a partly-sectional side view of the same. Fig. 3 is a top view of the improvement, and Fig. 4 is an enlarged transverse sectional view substantially on the line 4 4 in Fig. 3.

The handle-bar 5 employed consists of an elongated metal body, mainly rectangular in cross-section, having the central longitudinal slots $a$ and 11 therein, the former being of greater width than the latter. The rear end portion $5^a$ of the bar is rendered cylindrical and is axially perforated. On the cylindrical end portion $5^a$ of the handle-bar is formed an external thread upon which is screwed the forward end of an internally-threaded thimble 6, into the rear end of which the forward end of a tubular shank 7 is screwed, whereby the shank is held extended centrally from the rear end of the handle-bar. Upon the shank 7 a preferably wooden grip-piece 8 is mounted, which receives at its forward end an adjacent end of the thimble 6. In the hollow shank 7 an adjusting-rod 9 is inserted and passes loosely through the axial perforation in the part $5^a$ of the handle-bar and also between the side walls of the slot $a$. The adjusting-rod is cylindrical and is externally threaded from the forward end thereof for about half its length, as indicated at $b$ in Fig. 2. Upon the threaded body of the adjusting-rod 9 two nuts $c\ c$ are mounted and jammed together at a point which will locate these nuts as a fixed collar on the rod 9 between the rear end of the portion $5^a$ and the front end of the hollow shank 7, thus preventing endwise movement of the adjusting-rod, but permitting its free rotation. A thread is formed on the rear end of the hollow shank 7, and upon said thread is screwed a circular collar $d$, said collar bearing upon the rear end of the grip-piece 8 and securing it from endwise movement on the shank, as shown in Fig. 2. The rear end of the adjusting-rod 9 is threaded, and upon said thread a circularly-edged thumb-piece 10 is screwed, having a loose engagement with the collar $d$. Upon the projecting end of the adjusting-rod 9 a jam-nut $e$ is screwed into close engagement with the thumb-piece 10, thus adapting the latter for rotating the rod when manipulated, and to facilitate the rotatable movement of the thumb-piece 10 its periphery is milled or roughened, as shown, said periphery projecting slightly outside of the grip-piece to permit it to be grasped readily.

Upon the handle-bar 5, over the slot 11, a slide 12 is mounted, a depending lug $12^a$ at the rear end of said slide fitting loosely into the slot $a$. In the lug $12^a$ a threaded hole is formed, wherein the forward end of the adjusting-rod 9 is screwed, and on the extremity of said rod that projects through the lug a nipple $f$ is formed, that is seated in a matting socket formed in the cross-bar $11^a$ of the handle-bar between the slots $a$ and 11 thereof. A clamping-bolt 13 is provided for locking the slide 12 in place, said bolt having a beveled head $g'$, that passes through the slot 11 of the handle-bar and also through a perforation in the slide near the forward end of the latter. The lower edges of the slot 11 are beveled to provide a countersink on the block 11 for the reception of the bolt-head $g'$, which is thus adapted for seating in the slot, having its flat head-face flush with the lower surface of the handle-bar, as appears in Fig. 2, said bolt extending through the slide 12 sufficiently to receive a milled nut 13ª, which by rotatable movement serves to hold the slide stationary on the handle-bar 5 at any point of slidable adjustment desired.

A cutter-bit 14 is securable on the lower surface of the handle-bar 5 by screws 15, passed through perforations in the stock of the bit and screwed into threaded perforations in the cross-bar 11ª and the forward end 11ᵇ of the handle-bar, as shown in Fig. 2 The nose 14ª of the cutter-bit may have any preferred form best adapted for cutting wooden material that for the manufacture of an article by turning is held and rotated at proper speed in a wood-turner's lathe. As shown, the nose of the cutter-bit is in the form of a flattened "gouge" that is a common shape for a wood-turning chisel.

On the forward end of the slide 12 a curved caliper-leg 16 is mounted by screwing one end of the leg into a tapped hole in the slides, said leg that curves upward and forward from the slide preferably terminating at the forward end in an outwardly-bent finger 16ª.

On one side of the handle-bar 5 a graduation $h$ is formed, being a scale indicating inches and fractions thereof, and upon the adjacent side edge of the slide 12 an indicator-finger $h'$ is formed or secured, which by its position when moved over the scale indicates the degree of reduced space between the finger 16ª and the cutting edge of the nose 14ª, the maximum distance being shown in the drawings.

In using the improvement the operator holds the tool upon a lathe-rest while the material to be operated upon is rotating rapidly in the lathe and applies the cutter-bit nose 14ª to the right-hand end of the material, that of course is rotating rapidly toward the cutter-bit. By moving the cutter-bit toward the end of the billet of wood the bit will cut away the excess of material, and the contact of the finger 16ª oppositely upon the turned material will serve as a caliper-gage to indicate the diameter of the cylindrically-turned body that results from the turning operation. Obviously drawing the caliper-leg 16 toward the cutter by manipulation of the thumb-piece 10 will correspondingly reduce the distance between the finger 16ª and the cutting edge of the bit 14, so that cylindrical billets of any diameter within the capacity of the tool may be quickly and accurately turned. If variations from a cylindrical form are desired, the tool may be so held upon the lathe-rest that while it is cutting the material the thumb-piece 10 can be manipulated with one hand, so as to slide the caliper-leg toward or from said thumb-piece and correspondingly alter the form of the finished product.

Having thus described our invention, we claim as new and desire to secure by Letters Patent—

1. A combined turning-tool and calipers, comprising a handle-bar, a cutter-bit projecting from the forward end of the handle-bar, an adjustable caliper-leg carried by the handle-bar and projecting beyond and in front of the cutter-bit, and means for adjusting the caliper-leg from the rear end of the handle-bar.

2. A combined turning-tool and calipers, comprising a handle-bar, a cutter-bit projecting from the forward end of the handle-bar, a sliding member on the handle-bar, a caliper-leg secured to said sliding member and projecting beyond and in front of the cutter-bit, and means for operating the sliding member to move the caliper-leg toward and from the cutter-bit.

3. The combination with a slotted handle-bar, a cutter-bit, and a slide mounted on the handle-bar, of means for clamping the slide-block upon the handle-bar, means for securing the cutter-bit on the handle-bar, and a curved caliper-leg secured by one end on the slide and extended in advance of the cutter-bit.

4. The combination with a handle-bar having a longitudinal slot, a slide mounted on the handle-bar, and having a perforate internally-threaded lug depending at one end and working in said slot, a cutter-bit securable on the lower side of the handle-bar and projecting at the forward end thereof, releasable means for clamping the slide on the handle-bar, an exteriorly-threaded adjusting-rod engaging the lug in its perforation, means for turning said rod, and a curved caliper-leg mounted by one end on the slide and extended in advance of the cutter-bit.

5. The combination with a handle-bar having two longitudinal slots, a slide mounted on the handle-bar and having a depending, perforated, internally-threaded lug on its rear end, working in one of the slots in the handle-bar, a screw-bolt passing through the other slot in the handle-bar and through a perforation in the slide, a clamping-nut on the projecting end of the screw-bolt, a threaded adjusting-rod held in the slot in the outer end of the handle-bar and engaging the depending lug, means carried at the rear end of the adjusting-rod for its manual rotation, a cutter-bit having its nose projected forward of the handle-bar, and a curved caliper-leg secured by one end on the forward end of the slide and having its free end extended in advance of the cutter-bit.

6. In a device of the character described, the combination with a handle-bar having a graduated scale on one side, of a cutter-bit on the lower side of the handle-bar, the cutting edge thereof projecting forward of said bar, a slide on the forward portion of the handle-bar, an index-finger on the slide indicating on the scale, a curved caliper-leg secured by one end on the slide, and having its free end extended in advance of the cutting edge of the bit, and means for operating the slide and thus adjusting the free end of the caliper-leg toward or from the cutting edge of the bit.

In testimony whereof we have signed our names to this specification in the presence of two subscribing witnesses.

RAY S. WHIPPLE.
JOHN A. OLESSAK.

Witnesses:
CHAS. C. WARWICK,
AL. P. BURCHELL.